July 2, 1968
H. L. CAMPBELL
3,391,271
ELECTRIC FOOD COOKER
Filed Dec. 18, 1964
2 Sheets-Sheet 1
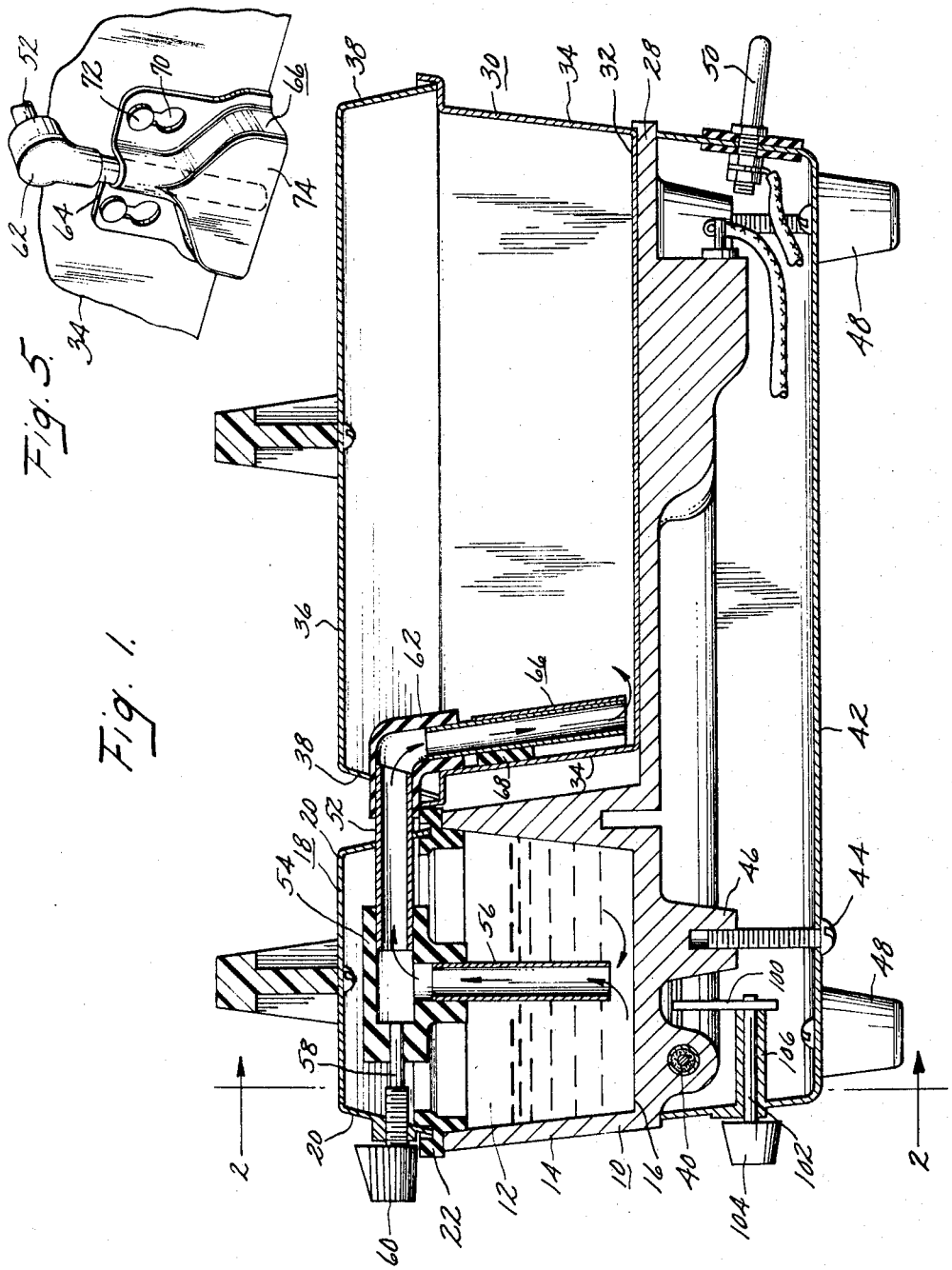
Inventor:
Hugh L. Campbell
by Gordon H. Olson
Attorney July 2, 1968  H. L. CAMPBELL  3,391,271
ELECTRIC FOOD COOKER
Filed Dec. 18, 1964  2 Sheets-Sheet 2
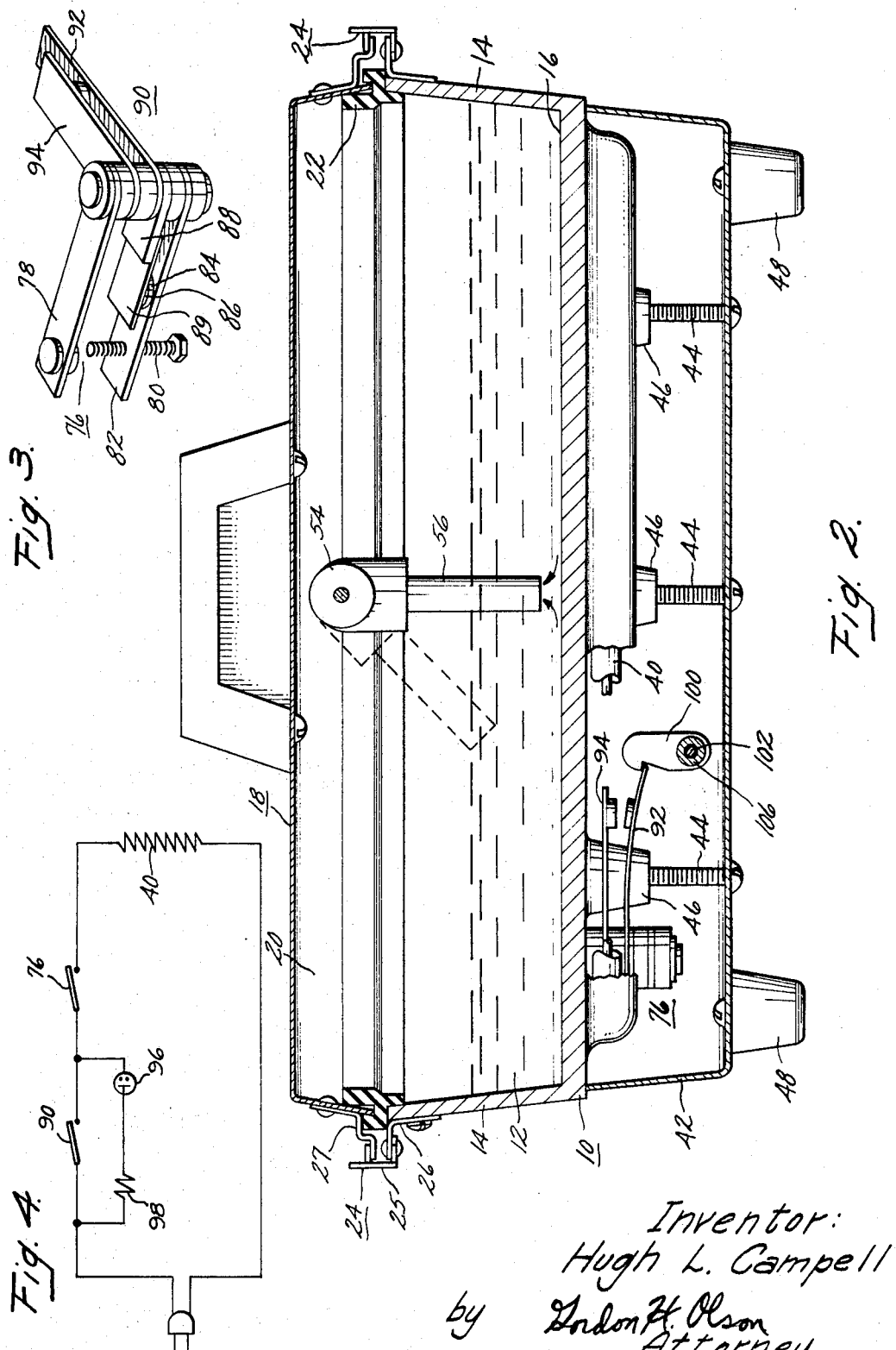
Inventor:
Hugh L. Campell
by Gordon H. Olson
Attorney 3,391,271
ELECTRIC FOOD COOKER
Hugh L. Campbell, Weatherly, Pa., assignor to General
Electric Company, a corporation of New York
Filed Dec. 18, 1964, Ser. No. 419,468
17 Claims. (Cl. 219—440)

ABSTRACT OF THE DISCLOSURE

An electric food cooker wherein water is heated in a boiler and transferred by steam pressure through a tube to a food container. Boiling all water from the boiler interrupts the heating, and the resulting cooling creates a vacuum to suck water from the food container through the tube thereby draining the food.

---

This invention relates to a novel electric appliance utilizing hot water and steam for automatically cooking food.

While there have been many advances in the electric appliance field which improve and simplify cooking, one basic operation which has remained essentially unchanged is that of preparing food with boiling water. Typically, the food and water are placed within a container and heated over a stove or other source of heat. When the operator feels the food is done, the heat is shut off, the water is manually drained from the food, or the food is removed from the water, and the food is placed into a serving container to be placed on the table. It is highly desirable that the inconvenient, and sometimes dangerous draining operation be eliminated. Because of the dislike for draining water from foods, many people leave food immersed in the hot water after cooking is completed. This results in over cooking, loss of vitamins, loss of flavor, and less attractively appearing food.

With many foods it is preferable that only boiling water contact the food; but since it is simplier, many people place the food in the unheated water and the food remains there until the water is heated and the food is cooked. An appliance which produces boiling water and then automatically transfers the water to a food container solves this problem and is a valuable contribution to the art.

Accordingly, it is a primary object of this invention to provide an improved appliance which will generate steam and hot water in one chamber and utilize the steam pressure to force the hot water into a food container.

It is another object of this invention to provide an appliance which will automatically cook food with boiling water or steam and automatically drain the water from the food at the completion of the cooking cycle.

It is a further object to provide such an appliance with a simple, adjustable control for determining the duration of the cooking cycle.

Yet another object of the invention is to provide a control for such an appliance which will indicate to the user when the cooking and draining operations are completed.

In accordance with one aspect of this invention, the electric food cooker includes a sealed water or liquid chamber positioned adjacent a food container with a fluid passage extending between the upper portion of the container and the chamber. The passage end portions extend downwardly so that one end is spaced slightly from the bottom wall of the food container and the other end is spaced from the bottom wall of the water chamber. After a source of heat has heated the water in the chamber to the boiling point, the steam created within the sealed water chamber forces the quantity of water, which extends above the end of the passage within the water chamber, up through the passage and into the food positioned in the food container to thereby cook the food. The water located below the end of the passage within the water chamber continues to vaporize with the steam escaping up the passage. After all water in the chamber has been boiled away, a thermostat or other control means de-energizes the heater and the chamber begins to cool. After the chamber temperature has dropped sufficiently, a vacuum is created causing the liquid within the food container to be drawn back into the water chamber thereby automatically draining the food.

As another aspect of the invention there is provided a manual control for adjustnig the spacing between the end of the passage within the water chamber and the chamber bottom wall. Since the amount of water between the end of the passage and the bottom wall must be vaporized before the heat will be shut off, this arrangement provides a simple and inexpensive means for adjusting the duration of the cooking cycle. By the use of a manually controlled latch switch in conjunction with a unique but simplified control circuit, a signal indicating the completion of the draining operation is also provided.

Further features, objects and advantages of the invention will become apparent with reference to the following specification and drawings in which:

FIG. 1 is a side elevational cross-sectional view of the appliance of the invention;

FIG. 2 is a cross-sectional view along the lines 2—2 of FIG. 1;

FIG. 3 is a perspective view of the thermostats used in the electrical control of the invention;

FIG. 4 is a schematic diagram of the electrical control circuit for the appliance, and FIG. 5 is a perspective view of the end of the fluid passage in the food container of the appliance.

Referring first to FIGS. 1 and 2, the appliance of the invention may be seen to include a metal casting 10 of square or rectangular cross-section. On one side of the casting there is formed integral therewith a water or liquid chamber 12 of rectangular cross-section having upstanding side walls 14 and a bottom wall 16. A cover 18 forms a top wall for the water chamber 12 and is further provided with depending side walls 20 which cooperate with the side walls 14 to complete the enclosure.

To make the water chamber liquid or vapor tight, there is provided a gasket 22 formed of rubber or similar material positioned between the side walls 14 and the cover side walls 20. The cover may be releasably clamped to the side walls 14 of the chamber 12 by any suitable means such as a pair of clamps 24 shown in FIG. 2. Each clamp includes a moving member 25 which is pivotally mounted on a bracket 26 attached to side wall 14 and is horizontally pivotable into engagement with a bracket 27 attached to side wall 20 of cover 18.

The casting 10 further includes a horizontally oriented wall or surface 28 extending adjacent the water chamber in approximately the same plane as the bottom wall of the chamber. The horizontal wall 28 forms a flat surface for receiving a removable food container 30 having a bottom wall 32 and upstanding side walls 34. A cover 36 forming a top wall, and having depending side walls 38, co-operates with the upstanding side walls 34 to complete the food container.

To provide heat for the water chamber and the food container, a sheathed electrical heating element 40 is formed integral with the lower surface of the casting 10 and positioned to obtain the desired heat pattern. In the arrangement shown, the heater extends beneath the length of the water chamber, along the short ends of the water chamber and along approximately one-half of each end of the horizontal wall 28 before extending inwardly towards the central portion of the wall and then extending outwardly to terminate near the edge of the wall remote from water chamber 12.

A lower shell 42 attached by suitable fastening members 44 to lugs 46 formed integral with casting 10 encloses the electrical circuitry of the appliance, and supports the unit. Insulating feet 48 are attached by suitable fasteners to the bottom wall of shell 42. Conventional electrical terminals, one of which is shown at 50 in FIG. 1, are mounted in insulated fashion in the side wall of shell 42 to provide connections between the heater terminals and other electrical circuitry of the appliance and an external power cord.

In accordance with the invention, a passage is provided for forcing fluid into the food container and subsequently drawing liquid back into the water chamber. In the embodiment illustrated, the passage is formed by a series of connected tubes; however, it should be understood that various arrangements can be utilized including forming the tubes as an integral unit or forming the passages integral with the casting walls. As seen in FIG. 1, a tube 52 extends through openings formed in the depending side walls of the covers 18 and 36. The joint between tube 52 and side wall 20 of cover 18 is sealed to prevent steam or water leakage. The joint between the tube 52 and side walls 38 of cover 36 need not be sealed. A tubular member 54 forming a 90° elbow has its horizontal opening attached to the end of tube 52 located within the water chamber. The downwardly extending opening in the elbow is connected to a tube or tubular extension 56 which extends towards the bottom of the chamber with its lower end being spaced from the bottom wall to permit water flow. Naturally, elbow 54 and tube 56 may be formed as a single tube having the necessary bend.

The passage located within the food container 30 also includes tubular extensions attached to the end of tube 52. More specifically, one end of a flexible tubular elbow 62 is attached to the end of tube 52 within the food container, and the opposite end of the elbow is attached to a tube or tubular extension 64 removably mounted on the interior of container side wall 34 adjacent the water chamber. In accordance with one aspect of the invention, the lower end of tube 64 is spaced slightly from the container bottom wall 32. The specific means shown in the drawings for removably securing tube 64 to the container will be described in detail after an explanation of the liquid flow within the appliance.

It will be realized that when water is placed into chamber 12 at least to a level above the lower end of tube 56 and heated to the boiling point by heater 40, the steam generated within the sealed chamber creates an internal pressure forcing water up tube 56 through elbow 54, and the remainder of the passage into the food container. After the water level within the water chamber has been lowered to the level of the lower end of tube 56, no further water in liquid form will be forced out of the chamber, but the steam generated will continue to pass through the passage until all the water within the chamber has vaporized.

To automate the appliance, a suitable thermostat may be provided to sense the rising temperature within the chamber or of a chamber wall after the water has all been vaporized and terminate the heating cycle. For example, a thermostat may be placed in contact with the bottom wall of the chamber. Thus, the amount of water located between the lower end of tube 56 and chamber bottom wall 16 provides an indication of the duration of the cooking cycle within the food container 30. To minimize the possible formation of scale or sediment in the chamber caused by allowing the chamber to boil dry, the thermostat may be positioned in heat conducting relation with a chamber surface which is raised somewhat from the lowest point within the chamber so that the thermostat will function before all water is vaporized.

In most cooking operations using boiling water it is desirable that the water be drained from the food after the completion of the cooking cycle. With the arrangement shown and described, this appliance is uniquely provided with the capability to automatically drain food, thus freeing the cook from this inconvenient and sometimes dangerous chore. After all water in the water chamber has been vaporized and the heater de-energized, the water chamber cools causing a collapse of pressure within the chamber. The vacuum thus created will suck the water in the food container back up through the tube 64 and the remainder of the tube passage into the water chamber. Thus the food is automatically cooked and drained. The flexible elbow 62 may then be disconnected from tube 52 and the elbow along with tube 64 removed from the food container. By providing the food container with a lightweight, attractively styled construction, it may be removed directly to the table for serving.

Since the amount of water located between the lower end of tube 56 and bottom wall 16 of chamber 12 is an indication of the duration of the cooking operation, as another aspect of the invention the lower end of tube 56 may be made adjustable with respect to the bottom wall to provide a suitable control of the cooking period. For this purpose, elbow 54 is rotatably connected to the end of tube 52 so that it may be moved through an arc, as shown in FIG. 2, to vary the amount of water between the lower end of the tube and the bottom wall 16 of the chamber. The elbow is rotated by means of a control shaft 58, connected to the elbow and extending through the cover side wall 20, and a control knob 60. It will be realized that the duration of the cooking cycle is increased from the shortest cooking cycle position shown with tube 56 in full lines to the dotted line position shown, in that the amount of water to be vaporized is increased. If desired, knob 60 may be calibrated to indicate the cooking time in minutes.

By rotating knob 60 so that the tube is moved above the water level, only steam is forced through the passage. In such position, the appliance may be conveniently used for cooking foods solely by steaming and the duration of the steaming operation is controlled by the amount of water placed into the chamber. It should also be understood that if it is only desirable to transfer hot water into the cooking container and not desirable to drain the water from the container at the completion of the cooking cycle, it is not necessary to extend the liquid passage to a point near the bottom wall of the container. In such a case, elbow 62 and tube 64 are simply not connected to the end of tube 52. Examples of foods which might be prepared by merely adding boiling water are sauces and canned soups.

It should be noted that the tubular passage and control means have been mounted to facilitate cleaning of the appliance. Tube 52, elbow 54, and tube 56 are all carried by chamber cover 18 along with control shaft 58 and knob 60. Hence, the water chamber is not obstructed. Similarly, by having tube 64 and elbow 62 removable from the container 30, the cleanability of the food container 30 is enhanced.

While various means may be employed a preferred mounting arrangement for the tube 64 is shown in FIG. 5. Tube 64 is secured to a metal bracket 66 by welding, soldering, or by suitable adhesives, such as silicone rubber, as indicated at 68 in FIG. 1. The bracket is formed with a pair of keyhole slots 70 on opposite sides of tube 64. These slots cooperate with pins 72 attached to the container side wall 34. The larger portion of the slot fits over the pinhead and the bracket slides downwardly so that the pin shaft fits within the upper part of a slot 70. The pinhead is larger than the upper portion of the slot; hence, when the bracket is lowered to the position shown in FIGS. 1 and 5, it is securely clamped in position.

As can be seen in FIG. 5, the bracket 66 is formed with a flared shroud or manifold 74 on its lower end surrounding the lower end of tube 64. When water and steam are forced into the food container through tube 64, there is a certain amount of agitation caused which speeds the heating and cooking operation of the food within the container. This is particularly helpful with food such as frozen vegetables which are placed directly into the food container in the frozen condition. The shroud or manifold 74 uniquely distributes the bubbling steam and water to spread the agitation throughout a wide area. During the draining operation, the manifold 74 also serves as a shield or guard to minimize the possibility of food particles blocking the tube 64 by being spaced slightly from the bottom wall of the container.

As mentioned previously, the means to terminate the heating cycle may take the form of a bimetallic thermostat or thermostatic switch assembly, such as that indicated at 76 attached to the lower surface of the casting beneath the water chamber. Referring to FIG. 3, the assembly includes a bimetallic element 78 which when cold engages the lower surface of casting 10. When the bimetallic element 78 is heated, it deflects downwardly to engage adjustable screw 80 extending through the end of flexible contact arm 82. Flexible contact arm 82 carries a contact 84 and normally urges the contact to engage contact 86 mounted on rigid contact arm 88. As can be seen in FIG. 4, thermostat 76 is connected in series with heater 40. When the temperature of the water chamber rises above the boiling temperature of water, bimetallic element 78 deflects causing contact arm 82 to be moved to open the thermostat.

It is desirable that the thermostat remain closed until after the water or liquid has been drawn back into the liquid chamber. In other words, the thermostat is not to simply cycle at approximately one temperature but is to open at a temperature somewhat above the boiling temperature of water and close at a lower temperature somewhat below the boiling point. To provide this compensation, a tab 89 on the outer end of the rigid contact arm 88 is also a bimetal and is oriented to delay the closing of the thermostat until after the water has been drawn back into the liquid chamber. That is, tab 89 flexes downwardly, as viewed in FIG. 3, when heated by the current flowing therethrough. Thus, when element 78 is cooling and moving upwardly in switch closing direction, tab 89 cooling at a more rapid rate also moves upwardly to delay closing of the switch.

As another aspect of the invention, means are provided to indicate when the entire cooking and draining operation is complete. Since the draining has not taken place as soon as the thermostatic switch opens, it is necessary to include additional control means. For this purpose, there is provided thermostatic switch 90 referred as as a latch switch and including a flexible contact arm 92 and a bimetallic arm 94. As seen in FIGS. 2 and 3, the latch switch 90 is physically mounted on the same stack as the thermostat 76. The latch switch is serially connected to the thermostat 76 and the heater 40, as shown in FIG. 4. A pilot light 96 and a limiting resistor 98 are serially connected in parallel with the latch switch 90. The pilot light may extend through a wall of the lower shell 42 at a convenient location. As shown in FIG. 2 there is further provided a pivotable latch 100 movable by a control shaft 102 and control knob 104 carried by housing 106, as seen in FIG. 1. The latch normally assumes the position shown in FIG. 2 wherein it holds flexible contact arm 92 with its outer end bent downwardly; however, by rotating knob 104, the latch may be turned so as to release arm 92 allowing it to snap upwardly and engage bimetallic arm 94.

With water in the chamber 12 as shown in FIG. 1 and with the electric terminals 50 connected to a source of power, the operation of the appliance and its electrical controls is as follows. Thermostat 76 is closed since it is cold, but latch switch 90, although cold, is held open by latch 100 and hence the pilot light is on. The heater 40 is energized, but due to the high resistance of resistor 98 the current flow and heat produced is minimal. The light indicates that the appliance is set to be operated. To initiate operation, control knob 104 is rotated, pivoting latch 100 in a clockwise direction, as viewed in FIG. 2, permitting flexible contact arm 92 to move upwardly to engage bimetallic contact arm 94, thus closing the latch switch. The subsequent heat produced creates steam pressure which forces a volume of water, equal to that above the lower end of tube 56, into food container 30. The water remains in container 30 until the water below the end of the tube 56 in chamber 12 has vaporized and the temperature of thermostat 76 raised sufficiently to cause bimetallic arms 78 to flex downwardly to open contacts 84 and 86. During the heating operation, the latch switch 90 remains closed although the heat produced by the current flowing through latch switch 90 has caused bimetallic arm 94 and flexible arm 92 to move downwardly so that arm 92 is once more in position to be held by latch 100. The pilot light has, of course, not been energized during this heating operation and it naturally remains unenergized after thermostat 76 opens. The draining operation is yet to be completed. Bimetallic arm 94 quickly cools and moves upwardly once the current ceases to flow as a result of the opening of thermostat 76, but flexible arm 92 is retained in the position shown in FIG. 2 by latch 100. By the time the liquid has been drawn back into container 12, thermostat 76 has cooled sufficiently to once more close; and since latch switch 90 is held open, pilot light 96 is energized, signaling that the operation is complete.

There are several modifications which can be incorporated into the appliance. To maintain the food at proper serving temperature after the completion of the cooking cycle, a keeps-hot heater can be connected in parallel with the pilot light. This heater would then be energized at the completion of the cycle after water has returned to the water container. A snap-action bimetal switch can be substituted for the thermostat 76. The differential inherent in such a device would perform the function of the tab bimetal 89. If desired the latching switch and pilot light can be incorporated in a probe type housing and the thermostat (or snap-action switch) might then be encapsulated to permit immersibility of the appilance.

From the foregoing, it can be appreciated that a unique completely automatic cooking appliance which eliminates draining operations has been provided. Such an appliance is particularly adapted for handling the frozen foods which are currently available, such as frozen vegetables. The vegetables may be placed directly into the food container while in a frozen condition where they will be thawed, cooked and drained all automatically. Also as previously indicated, the appliance is suitable for foods which require hot water, but do not require draining. With the simple control knob 60 and the rotatable tube means 54 and 56, the duration of the cooking cycle can easily be set. By means of the unique electrical control circuit described, the operator need not worry about over-cooking the food or need not worry about the food being left too long in the water after the cooking operation, in that the circuitry automatically terminates the heating cycle, drains the food, and further tells the user when the operation is completed.

In addition to the specific modifications cited, it should be understood that various other changes to the embodiment described will readily come to mind to one skilled in the art. It is intended that all such modifications that fall within the true spirit and scope of the invention are to be included in the appended claims.

What is claimed is:

1. An electric food cooker comprising a casting having means defining a sealed water chamber and a heating surface adjacent the chamber; a food container positioned on said heating surface adjacent the water chamber; means defining a fluid passage extending between the upper portion of the chamber and said container; tubular means having one end connected to said passage within said chamber and having its other end spaced from the bottom wall of the chamber but below the level to which water may be added to the chamber; means for heating said casting said means being located below said water chamber and below said food container heating surface; and means for de-energizing said heating means said heating means being located below said water chamber and below said food container heating surface after the water has been boiled from the water chamber.

2. An electric food cooker comprising means defining a sealed water chamber; means defining a food container; means defining a fluid passage extending between said chamber and said container; the end of said passage within the water chamber being located below the level to which water will be added to the chamber; the end of said passage within said container being spaced slightly from the bottom wall of the container; said passage having a portion positioned above the level to which liquid will be added in said chamber and said container; means for simultaneously heating said chamber and said food container; and means for simultaneously de-energizing said heating means after the water chamber is emptied.

3. An electric food cooker comprising a sealed water chamber defined by side walls, a bottom wall and a top cover; means defining a food container located adjacent the water chamber; means for simultaneously heating said container and said chamber; means defining a fluid passage extending between the upper portion of said container and said chamber with the end portions of the passage extending downwardly so that one end is spaced slightly from the bottom wall of the food container and the other end is spaced between the bottom wall of the water chamber and the upper edge of the side walls; and means for de-energizing said heating means after the water has been boiled from the water chamber.

4. An electric food cooker comprising a casting forming a water chamber and a flat horizontal wall extending adjacent the chamber; a sheathed heating element formed integral with the casting extending beneath said chamber and said horizontal wall; a thermostat in contact with the casting adjacent the water chamber to de-energize the heating element when the water chamber is empty; a food container removably positioned on said horizontal wall adjacent said water chamber; tube means extending through the upper portion of said container and said chamber with the end of said tube means in the water chamber being adjustably spaced from the bottom wall of the chamber and the end of said tube means in said food container being slightly spaced from the container bottom wall.

5. An electric food cooker comprising a sealed water chamber defined by side walls, a bottom wall and a top wall; means defining a food container located adjacent the water chamber; means for heating said chamber; means defining a fluid passage extending between the upper portions of said chamber and said container; tube means having one end connected to the end of said passage located in the water chamber; means for adjustably spacing the other end of the tube means from the bottom wall of the water chamber; and means for de-energizing said heating means after the water has been boiled from the water chamber.

6. An electric food cooker comprising a sealed water chamber defined by side walls, a bottom wall and a top cover releasably sealed to said side walls; a food container located adjacent the water chamber defined by side walls, a bottom wall and a top cover; means for heating said chamber; tube means defining a fluid passage extending between said covers with the portion of the tube means within the food container extending downwardly so that its end is spaced slightly from the bottom wall of the food container and with the portion of the tube means in the water chamber extending downwardly and being movable so that its end may be adjustably spaced from the bottom wall of the water chamber; means connected to said tube means extending through said cover to provide a manual control for adjusting the position of said tube means relative to the bottom wall of the water chamber; and means for de-energizing said heating means after the water has been boiled from the chamber.

7. An electric food cooker comprising means defining a sealed water chamber; means defining a food container located adjacent the water chamber; means for heating said chamber; means defining a fluid passage extending between the upper portion of said container and said chamber with the end portion of the passage within the food container extending downwardly so that its end is spaced slightly from the bottom wall of the food container; a tubular elbow having one end rotatably connected to the end of the passage located in the water chamber with the other end of the elbow being swingable through an arc to be adjustably spaced from the bottom wall of the water chamber; a shaft connected to said elbow extending through said cover to provide a manual control for rotating the elbow to adjust the position of said other elbow end; and means for de-energizing said heating means after the water has been boiled from the water chamber.

8. An electric food cooker comprising a water chamber having a bottom wall, side walls, and a removable cover forming a top wall with depending side walls for sealingly engaging the upstanding side walls; a flat horizontal wall integrally formed with said container and extending adjacent the container; heating means extending beneath said water chamber and said horizontal wall; a thermostat in contact with the bottom wall of the water compartment to de-energize the heating element when the water compartment is empty; a food container having a bottom wall, side walls, and a removable cover forming a top wall with depending side walls engaging the side walls of the food container; said food container being removably positioned on said horizontal surface adjacent said water compartment; tube means extending through the adjacent side walls of said covers into said containers with the end of said tube means in the water chamber being spaced from the bottom wall of the water chamber and with its other end slightly spaced from the container bottom wall.

9. An electric food cooker comprising a water chamber having a bottom wall, upstanding side walls, and a removable cover forming a top wall with depending side walls for sealingly engaging the upstanding side walls; a flat horizontal wall integrally formed with said chamber and extending adjacent the chamber; a sheathed heating element extending beneath said chamber and said horizontal wall; a thermostat in contact with the bottom wall of the water chamber to de-energize the heating element when the water compartment is empty; a food container having a bottom wall, side walls, and a removable cover forming a top wall with depending side walls engaging the side walls of the food container; said food container being removably positioned on said horizontal wall adjacent said water chamber; a tube extending through a side wall of one cover into the adjacent side wall of the other cover; a first tubular extension connected to the end of said tube in the water chamber with the extension being adjustably spaced from the bottom wall of the chamber; and a second tubular extension removably mounted on an interior side wall of said food container with its lower end slightly spaced from the container bottom wall and its upper end separably connected to the end of said tube in the food container.

10. An electric food cooker comprising a sealed water chamber; a food container; means for heating said chamber; means defining a fluid passage extending between the upper portions of said container and said chamber with the end portions of the passage extending downwardly so that one end is spaced slightly from the bottom wall of the container and the other end is spaced from the bottom wall of the chamber; and means for controlling the operation of said cooker including a thermostatic switch positioned in heat transfer relation with the bottom wall of said water chamber and serially connected to said heating means, said thermostatic switch being adapted to open at a temperature above the boiling point of water and to close at a temperature below the boiling point of water; a normally closed latch switch serially connected to said thermostat and said heating means; a pilot light connected in parallel with said latch switch; said latch switch including a bimetallic contact arm and a flexible contact arm; and a manually controlled latch for maintaining said latch switch in an open position by holding said flexible contact arm as said bimetallic arm begins to cool and flex away from the flexible contact arm.

11. The food cooker of claim 10 wherein said thermostat includes a bimetallic arm, a flexible contact arm movable by said thermostat bimetallic arm, and a fixed contact arm having a bimetallic portion which prevents said thermostat contact arms from closing until the temperature of said water container is below the boiling point of water.

12. An electric food cooker for cooking food with hot water and automatically draining the water from the food comprising: a sealed water chamber for receiving a volume of water; a food container; means for heating said chamber; means defining a fluid passage extending between the upper portions of said container and said chamber with the end portions of the passage extending downwardly so that one end is spaced slightly from the bottom wall of the container and the other end is spaced from the bottom wall of the chamber; and means for controlling the operation of said cooker including a thermostat positioned in heat transfer relation with the bottom wall of said water chamber and serially connected to said heating means, said thermostat being opened after the water within said chamber has been removed from said chamber and closed after most of the water in the food container has been drawn back into the water chamber; means for signaling the completion of said cooking and draining operations; and means for preventing the energization of said signaling means until after the completion of the draining operation.

13. The food cooker of claim 12 wherein said thermostat includes a bimetallic arm, a flexible contact arm movable by said thermostat bimetallic arm, and a fixed contact arm having a bimetallic portion which prevents said thermostat contact arm from closing until most of the water in said water container has been drawn back into the water chamber.

14. An electric food cooker comprising a sealed water chamber; means defining a food container located adjacent the water chamber; means for heating said chamber; means defining a fluid passage extending between the upper portion of said container and said chamber with the end portions of the passage extending downwardly so that one end is spaced slightly from the bottom wall of the food container and the other end is spaced from the bottom wall of the chamber; an enlarged manifold surrounding the end of the passage slightly spaced from the bottom wall of the food container; and means for de-energizing said heating means after the water has been boiled from the water chamber.

15. In an appliance, an electric circuit comprising means for heating the appliance; a thermostat including means for sensing the temperature of the appliance and a switch controlled by the sensing means; said switch including means for delaying its closing action, a latch switch serially connected to said heating means and said thermostat switch and including a bimetallic contact arm and a flexible contact arm; signalling means connected in parallel with said latch switch; a latch for holding said flexible contact arm to control the closing of said latch switch, and manual means for operating said latch.

16. An appliance control circuit comprising a heater for the appliance; a thermostat and a latch switch serially connected to said heater; a pilot light and a current limiting resistor serially connected in parallel with said latch switch; said thermostat including a bimetallic element for sensing the temperature of said appliance, a flexible contact arm controlled by said element and rigid contact arm cooperating with the flexible arm, and a bimetallic tab forming a portion of said rigid contact arm and being oriented to delay the closing of said contact arms after being opened by said bimetallic element; said latch switch including a bimetallic contact arm and a flexible contact arm; a latch for holding said latch switch flexible contact arm away from said bimetallic arm when the bimetallic arm is cool; and a manual control for moving said latch to release said latch switch flexible contact arm.

17. An electric food cooker comprising a casting having means defining a sealed water chamber and a heating surface adjacent the chamber; a food container positioned on said heating surface adjacent the water chamber; means defining a fluid passage extending between the upper portion of the chamber and said container; tubular means having one end connected to said passage within said chamber and having its other end spaced from the bottom wall of the chamber but below the level to which water may be added to the chamber; an electric circuit comprising means for heating the appliance; a thermostat including means for sensing the temperature of the appliance and a switch controlled by the sensing means; said switch including means for delaying its closing action until after the water has been boiled from the water chamber.

References Cited

UNITED STATES PATENTS

| 2,422,580 | 6/1947 | Meier | 99—281 X |
| 2,566,916 | 9/1951 | Young | 99—292 |

FOREIGN PATENTS

| 179,622 | 9/1954 | Austria. | |

RICHARD M. WOOD, *Primary Examiner.*

C. L. ALBRITTON, *Assistant Examiner.*